Patented Aug. 22, 1950

2,520,037

UNITED STATES PATENT OFFICE 2,520,037

PROCESS FOR THE MANUFACTURE OF PYRIDYL-3-CARBINOL

Aaron Cohen, Welwyn Garden City, England, assignor to Hoffmann-La Roche Inc., Nutley, N. J., a corporation of New Jersey No Drawing. Application October 1, 1948, Serial No. 52,402. In Great Britain October 28, 1947

2 Claims. (Cl. 260—297)

1

The present invention relates to the manufacture of pyridyl-3-carbinol and a process for obtaining same.

The use of lithium aluminum hydride ($LiAlH_4$) as a reducing agent has been described by Nystrom and Brown in the Journal of the American Chemical Society, 1947, 69, page 1197. In this publication, the latter have described the reduction of esters to alcohols using this reagent. They also stated that this reagent reduces certain unspecified nitrogen heterocycles, but these reductions affected the C—C double bond.

According to the present invention, lithium aluminum hydride may be used for the reduction of nicotinic esters to pyridyl-3-carbinol. Thus, pyridyl-3-carbinol may be manufactured by acting upon an alkyl nicotinate with lithium aluminum hydride. The use of the ethyl ester of nicotinic acid is preferred. Substantially anhydrous conditions are necessary to ensure good yields.

The lithium aluminum hydride used as a reagent in the present invention may be prepared by the method of Finholt, Bond and Schlesinger (J. A. C. S. 1947, 69, page 1199).

The following example illustrates the nature of the present invention.

Example

A solution of 15.1 parts of ethyl nicotinate in 30 parts by volume of anhydrous ether was dropped gradually into a solution of 5 parts by weight of lithium aluminum hydride in 300 parts by volume of anhydrous ether while stirring in an atmosphere of nitrogen and cooling in ice-water. The precipitated material readily formed was stirred for a further hour with the ether and then decomposed with ice-water. After separation of the ethereal solution, the aqueous portion was made strongly alkaline by the addition of excess sodium hydroxide and submitted to continuous ether extraction. The combined ethereal solutions were dried with potassium carbonate and freed from ether. The residue was distilled under reduced pressure, yielding about 6.8 parts pyridyl-3-carbinol of boiling point 142–143°—15 mm. The picrate of this compound has melting point 158–160° and is identical with the picrate of pyridyl-3-carbinol prepared by the diazotisation of 3-aminomethyl-pyridine.

I claim:

1. A process which comprises reducing an alkyl nicotinate with lithium aluminum hydride under substantially anhydrous conditions to produce pyridyl-3-carbinol.

2. A process which comprises reducing ethyl nicotinate with lithium aluminum hydride under substantially anhydrous conditions to produce pyridyl-3-carbinol.

AARON COHEN.

REFERENCES CITED

The following references are of record in the file of this patent:

UNITED STATES PATENTS

| Number | Name | Date |
|---|---|---|
| 2,248,078 | Harris | July 8, 1941 |
| 2,266,754 | Harris | Dec. 23, 1941 |
| 2,310,167 | Carlson | Feb. 6, 1943 |
| 2,468,260 | Gibb | Apr. 26, 1949 |

OTHER REFERENCES

Cavallito: J. Amer. Chem. Soc., July 1944, pp. 1166–1171.

Nystrom: J. Amer. Chem. Soc., vol. 69 (1947), 1197–1199.